No. 12,080 Reissued Feb. 10, 1903

G. A. ENSIGN.

FEED ROLL.

(Application filed Sept. 6, 1902.)

(No Model.)

WITNESSES:

Edw. Thorpe.

Ned J. Power

INVENTOR

George A. Ensign

BY

ATTORNEYS.

THE NORRIS PETERS CO., PHOTO-LITHO., WASHINGTON, D. C.

UNITED STATES PATENT OFFICE.

GEORGE A. ENSIGN, OF DEFIANCE, OHIO, ASSIGNOR TO DEFIANCE MACHINE WORKS, OF DEFIANCE, OHIO.

FEED-ROLL.

SPECIFICATION forming part of Reissued Letters Patent No. 12,080, dated February 10, 1903.

Original No. 715,041, dated December 2, 1902. Application for reissue filed January 15, 1903. Serial No. 139,240.

*To all whom it may concern:*

Be it known that I, GEORGE A. ENSIGN, a citizen of the United States, and a resident of Defiance, in the county of Defiance and State of Ohio, have invented a new and Improved Feed-Roll, of which the following is a full, clear, and exact description.

The invention is an improvement in that class of feed-in rolls for wood-planing or other surfacing machines in which a series of individual rollers are so mounted upon a fixed shaft by means of intermediate non-rotatable hubs and so acted upon by springs as to allow them to yield to accommodate strips or pieces of lumber which are of different thicknesses without unduly straining the roll-supporting shaft.

The invention consists of novel features and parts and combinations of the same, as will be more fully described hereinafter and then pointed out in the claims.

A practical embodiment of the invention is represented in the accompanying drawings, forming a part of this specification, in which similar characters of reference indicate corresponding parts in both views.

Figure 1:
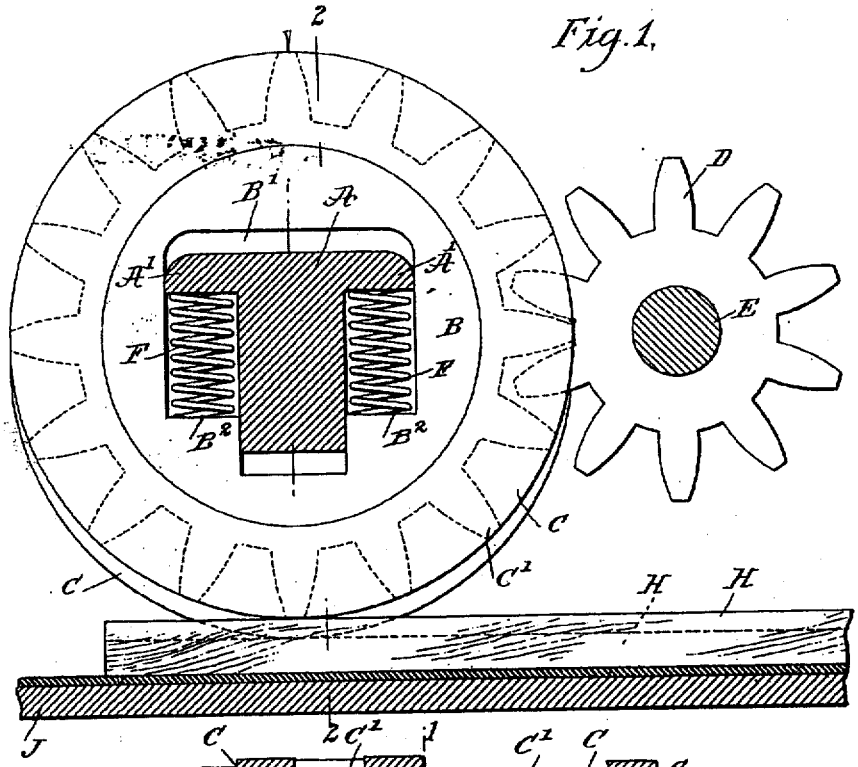
Figure 2:
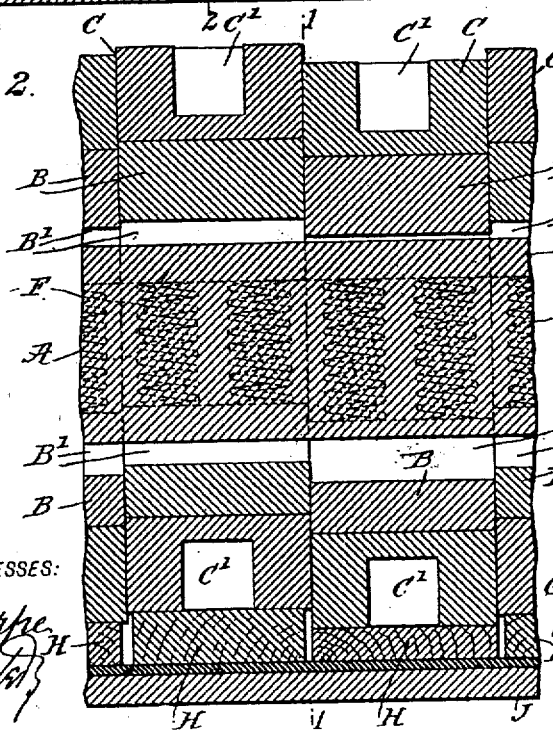

Figure 1 is a sectional side elevation of the improvement as applied, the section being on the line 1 1 of Fig. 2; and Fig. 2 is a transverse section of the same on the line 2 2 of Fig. 1.

On a fixed shaft A are mounted a plurality of feed-rollers arranged one alongside the other and having independent bodily-sliding movement on the shaft—that is to say, a movement transversely of the shaft and preferably vertically or in an up-and-down direction—each roller having its rim positively and independently driven to insure a positive feeding of the strips, pieces, or boards, as hereinafter more fully described. The shaft A is T-shaped in cross-section and extends through enlarged openings B′, formed in the hubs B of the rollers, the said openings having a portion of their side walls fitted against portions of the sides of the shaft A to form bearings for the hubs to slide up and down on the shaft.

On each of the hubs B is mounted to turn loosely a roller-rim C, formed with peripheral gear-teeth C′, arranged within the peripheral face of the rim and preferably at or near the middle thereof, as plainly indicated in Fig. 2, the said gear-teeth C′ being in mesh with a pinion D, secured on a driven shaft E, located to one side of the rollers. The teeth of each pinion D are in mesh with the gear-teeth C′ at an angle to the line of bodily movement of the rollers on the shaft, so that such movement does not interfere with or disturb the proper meshing of the gear-teeth C′ and pinion D.

The hubs B and their rims C are normally held in a lowermost position relative to the shaft A by springs F, preferably arranged in pairs, one for each hub, the upper ends of the springs resting against the under side of the side flanges or arms A′ of the shaft A, while the lower ends of the said springs rest on shoulders $B^2$, forming portions of the bottom walls of the openings B′, as plainly indicated in Fig. 1. Now by the arrangement described the springs F for each roller are located on opposite sides of the central web of the shaft A, and the aggregate strength of the said springs is sufficient to allow of using the rollers for very heavy work without danger of injuring the springs, and consequently the rollers, and at the same time allowing considerable yielding movement of the hubs B and rims C relative to the stationary shaft A. By the arrangement described the roller-rims C and their hubs B are free to yield upwardly when feeding pieces or strips H of lumber, boards, or other articles, over the bed J of the planing or surfacing machine, and as the said rims are positively driven it is evident that a positive feeding of the said strips or pieces H takes place.

Having thus described my invention, I claim as new and desire to secure by Letters Patent—

1. The combination, with a fixed shaft which is T-shaped in cross-section, of a circular hub applied thereto and having a transverse opening with whose sides both the enlarged head and reduced lower end or arm of the shaft work in sliding contact, a spring interposed between the head of the shaft and an abutment of the hub, and a toothed annular rim mounted to turn on said hub and having its periphery suitably constructed for engagement with the driving-roll, as shown and described.

2. A feed-roll comprising a shaft T-shaped in cross-section, hubs held against turning movement on the said shaft but free to slide up and down on the shaft, rims mounted to turn on the hubs, and springs interposed between the arms of the shaft and shoulders on the hubs, the springs being arranged in pairs, one for each hub, and the springs of a pair being disposed on opposite sides of the web of the shaft, within a recess formed in the corresponding hub, as set forth.

GEORGE A. ENSIGN.

Witnesses:
GEO. W. DEATRICK,
JOS. BAUER.